W. J. TURNBULL, DEC'D.
J. T. SULLIVAN & E. D. TURNBULL, EXECUTORS.
SLAT CONVEYER.
APPLICATION FILED APR. 22, 1914.
1,112,948.
Patented Oct. 6, 1914.
2 SHEETS—SHEET 1.
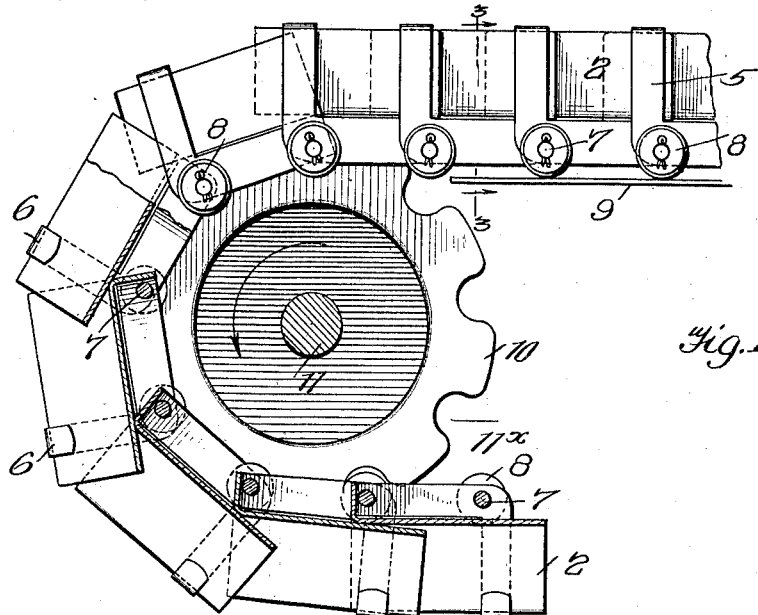
Fig. 1.
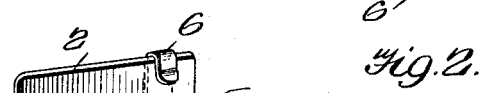
Fig. 2.
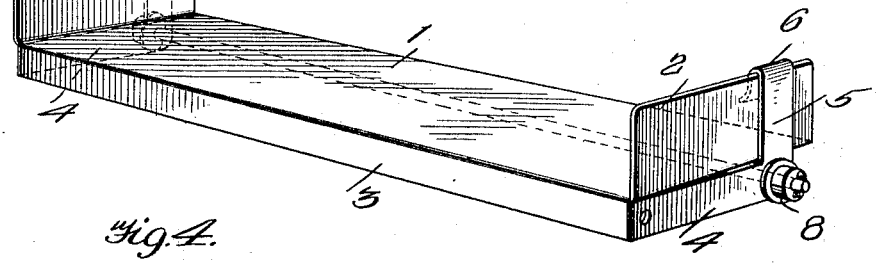
Fig. 4.
Fig. 3.
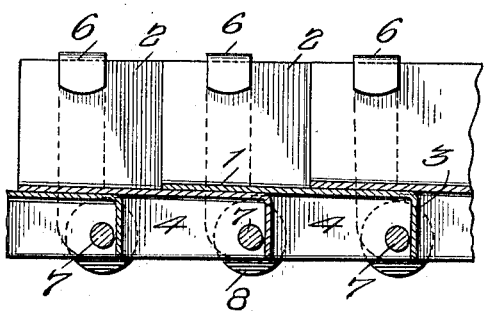
WITNESSES
EMILY D. TURNBULL
JOSEPH T. SULLIVAN
EXECUTORS OF THE ESTATE OF
WALTER J. TURNBULL
DECEASED
INVENTOR BY
ATTORNEYS W. J. TURNBULL, DEC'D.
J. T. SULLIVAN & E. D. TURNBULL, EXECUTORS.
SLAT CONVEYER.
APPLICATION FILED APR. 22, 1914.
1,112,948.
Patented Oct. 6, 1914.
2 SHEETS—SHEET 2.
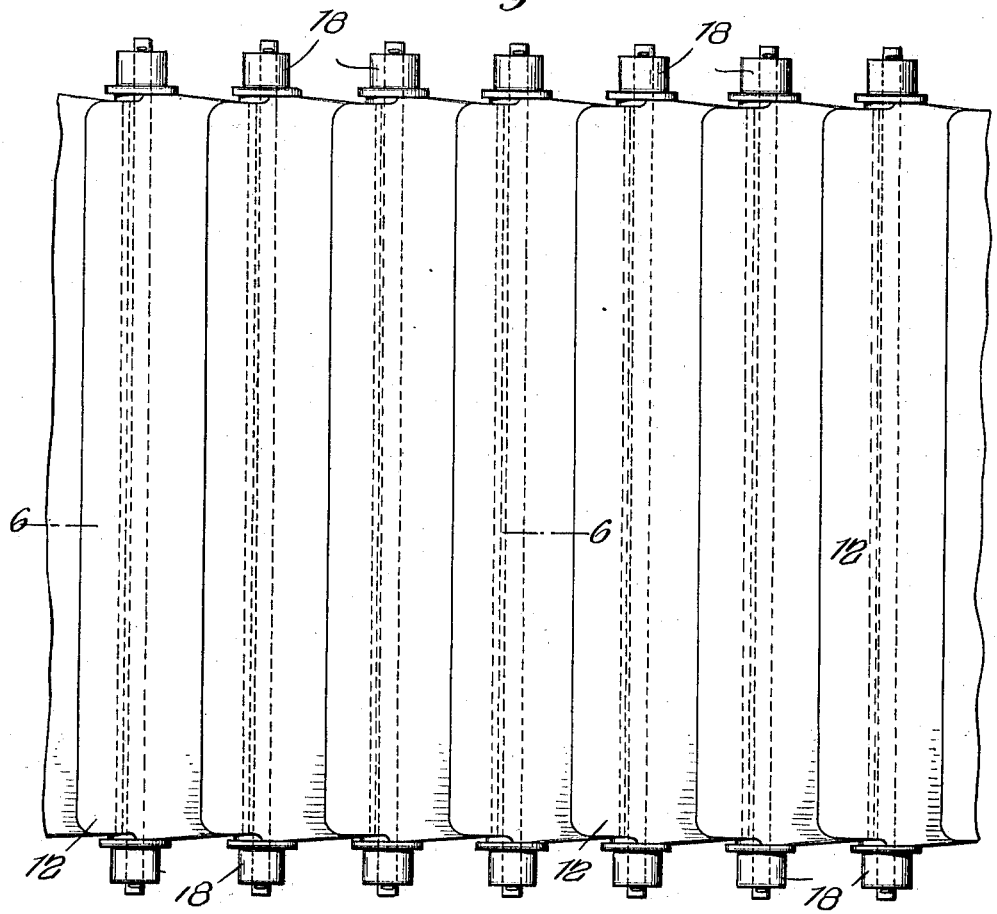
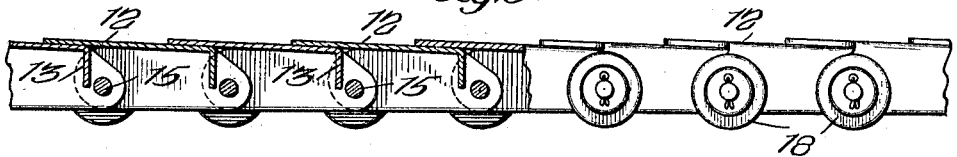
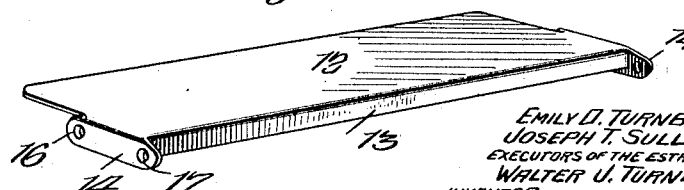
EMILY D. TURNBULL,
JOSEPH T. SULLIVAN,
EXECUTORS OF THE ESTATE OF
WALTER J. TURNBULL,
INVENTOR        DECEASED
BY *Munn & Co.*
ATTORNEYS
WITNESSES

UNITED STATES PATENT OFFICE.

WALTER J. TURNBULL, DECEASED, BY JOSEPH T. SULLIVAN AND EMILY D. TURNBULL, EXECUTORS, OF NEW ORLEANS, LOUISIANA.

SLAT CONVEYER.

1,112,948.     Specification of Letters Patent.     Patented Oct. 6, 1914.

Application filed April 22, 1914. Serial No. 833,723.

*To all whom it may concern:*

Be it known that we, JOSEPH T. SULLIVAN and EMILY DELANEY TURNBULL, citizens of the United States, and residents of New Orleans, in the parish of Orleans and State of Louisiana, have been appointed executors of the estate of WALTER J. TURNBULL, deceased, who during his lifetime invented certain new and useful Improvements in Slat Conveyers, of which the following is a specification.

This invention is an improvement in slat conveyers, and consists in certain novel constructions and combination of parts as will be hereinafter described and claimed.

An object of the invention is to provide a conveyer which is of the endless type, but the conveying surface of which is so fashioned as to present a substantially continuous flat surface, thereby preventing loss of material conveyed, while at the same time being capable of passing around the driving wheels at the end of the conveyer.

A further object of the invention is to provide means at the sides of the conveyer for preventing the spilling of the contents of the conveyer from the surface thereof, said means consisting of a series of interlocking side members, as will be hereinafter described.

Other objects and advantages will appear in the following specification and the novel features of the device will be particularly pointed out in the appended claims.

The invention is illustrated in the accompanying drawings forming part of this application in which—

Figure 1 is a side view of one end of the conveyer a portion being shown in section, Fig. 2 is a perspective view of one of the units, Fig. 3 is a sectional view along the line 3—3 of Fig. 1, Fig. 4 is a longitudinal sectional view through a portion of the device, Fig. 5 is a plan view of a modified form, Fig. 6 is a section along the line 6—6 of Fig. 5, and Fig. 7 is a perspective view of one of the units of the modified form.

In carrying out the invention use is made of a series of units or slats like that shown in Fig. 2. Each of these slats comprises a body portion 1 having upstanding flanges 2 at its ends. One edge of the body portion 1 is provided with a downwardly extending flange 3 which is preferably formed integral with the body portion, being bent as shown in the drawing. At each end of the flange 3 is an extension 4 which is bent at right angles to the flange 3 and parallel with the upstanding end 2. The extension 4 has an upwardly extending arm 5 provided at its top with a portion 6 bent over in the form of a hook which engages the upper edge of the end member 2.

The units are connected together by means of rods 7. These rods 7 pass through the flanges 4 near their junction with the arms 5. As will be seen from the drawing the units overlap so that the rods also pass through the members 4 of the adjacent unit close to the flange 3. As will be seen from Fig. 1, the upstanding end 2 of one unit also overlaps the upstanding end of the adjacent unit. Moreover the end 2 of one unit passes between the arm 5 of the adjacent unit and the end 2 of the adjacent unit.

Secured to the ends of the rods 7 are flanged rollers or wheels 8 which are designed to run on a track 9 (see Fig. 1). A sprocket wheel 10 is mounted on a shaft 11 and is designed to turn in the direction shown by the arrow in Fig. 1. The recesses 11$^x$ of the sprocket wheel are designed to receive the rollers. With the sprocket wheel revolving, as shown in Fig. 1 it will be apparent that as the units pass around the wheel they will assume the angular position shown in Fig. 1, this being the dumping end of the conveyer. Thus units which are on the upper side of the device at any given moment form a substantially flat surface. In Fig. 4 I have shown the relative positions of the overlapping units. It will be understood, of course, that the slats are shown of greater thickness than they would be in reality. This is for purposes of illustration. As a matter of fact the surface of the conveyer would be substantially flat on the upper part where the matter is being carried.

The provision of a device described as above has numerous advantages. In the first place the slats are positively locked together so as to prevent any escape of material carried thereby. This is true of the sides as well as of the bottoms. The flanges 3 constitute brace members. The rods 7 afford not only axles for the wheels or rollers 8, but also hinges about which the units may turn when they reach the sprocket wheel 10. The manner of making the units so as to provide interlocking members is also deemed important. Each unit may be made of a single piece of metal stamped and then bent in the shape shown, after which the rods and their rollers may be placed in position.

In Figs. 5, 6 and 7 we have shown a modified form of the device. In this form each unit comprises a body portion 12 having a laterally extending flange 13 on one edge and end flanges 14 which project beyond the flange 13, as shown in Fig. 7. The units are assembled so that the body portions 12 overlap. Rods 15 are provided which pass through openings 16 and 17 in the flanges 14. When assembled the device has the appearance of that shown in Fig. 6 in which the rods 15 pass close to the flanges 13 of the adjacent unit. Rollers or wheels 18 are provided which permit the conveyer to pass around sprocket wheels like that shown at 10 in Fig. 1. In this case, as in the form described in Figs. 1 to 4 inclusive the end flanges 14 of one unit also overlap the end flanges of the adjacent unit so that the rods 15 pass through these overlapped flanges. In this form of the device the top part of the conveyer is substantially flat, but the units freely move around the sprocket wheel and between the sprocket wheels again assume the position shown in Fig. 6.

The devices described are especially adapted to carry material such as fine sand, ore pulp, or any other material which has a tendency to leak through the cracks and crevices of the ordinary conveyer. The units are simply and cheaply made, but are of great strength owing to the mutual reinforcing of the members when in their locked position.

Claims:

1. In an endless conveyer, a plurality of units, each unit comprising a body portion having upturned end flanges, and a downwardly turned side flange, said side flange having laterally bent extensions lying substantially parallel with the upstanding end flanges, said parallel flanges being provided with upwardly extending arms bent at their tops to engage the tops of the upwardly extending end flanges.

2. In an endless conveyer, a plurality of units, each unit comprising a body portion having upturned end flanges and a downwardly turned side flange, said side flange having laterally bent extensions lying substantially parallel with the upstanding end flanges, said parallel flanges being provided with upwardly extending arms bent at their tops to engage the tops of the upwardly extending end flanges, a pivot rod carried by said parallel flanges near one end thereof, and a second pivot rod carried by said parallel flanges underneath the body portion and adjacent to the downwardly extending flange.

3. In an endless conveyer, a plurality of units each comprising a flat body portion and upwardly extending end portions, said body portion having a downwardly extending stiffening flange, the body portions of the adjacent units overlapping and the end flanges of adjacent units overlapping, and means for locking the end flanges of adjacent units together.

4. In an endless conveyer, a plurality of units each comprising a flat body portion and upwardly extending end portions, said body portion having a downwardly extending stiffening flange, the body portions of the adjacent units overlapping and the end flanges of adjacent units overlapping, means for locking the end flanges of adjacent units together, said last named means comprising integral extensions at the ends of said stiffening members, said extensions being spaced apart from said upwardly turned ends to receive the upwardly turned ends of the adjacent section, and means for securing a portion of the extension to said upwardly turned ends.

5. In an endless conveyer, a plurality of units each comprising a flat body portion and upwardly extending end portions, said body portion having a downwardly extending stiffening flange, the body portions of the adjacent units overlapping and the end flanges of adjacent units overlapping, means for locking the end flanges of adjacent units together, said last named means comprising integral extensions at the ends of said stiffening members, said extensions being spaced apart from said upwardly turned ends to receive the upwardly turned ends of the adjacent section, means for securing a portion of the extension to said upwardly turned ends, a pair of pivot rods extending through said extensions, and rollers carried by said pivot rods.

JOSEPH T. SULLIVAN,
Mrs. EMILY D. TURNBULL,
*Executors.*

Witnesses:
JOHN J. KORNFELD,
J. P. CHAPRON.

---

Copies of this patent may be obtained for five cents each, by addressing the "Commissioner of Patents, Washington, D. C."